United States Patent Office 3,531,489
Patented Sept. 29, 1970

3,531,489
BIS-BASIC ESTERS AND THIOESTERS
OF FLUORANTHENE
William L. Albrecht and Robert W. Fleming, Cincinnati,
Ohio, assignors to Richardson-Merrell Inc., New York,
N.Y., a corporation of Delaware
No Drawing. Filed Oct. 18, 1968, Ser. No. 768,893
Int. Cl. C07d 51/70
U.S. Cl. 260—294.3                                     12 Claims

ABSTRACT OF THE DISCLOSURE

Novel bis-basic ester and thioester compounds of fluoranthene selected from a base of the formula

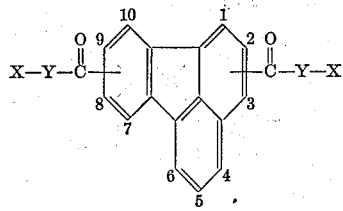

Formula I wherein each Y is oxygen or sulfur, and each X is: (A) the group

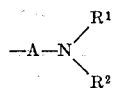

wherein each A is alkylene of 2 to about 8 carbon atoms which separates the amino nitrogen and Y by an alkylene chain of at least 2 carbon atoms and each $R^1$ and $R^2$ is hydrogen, (lower) alkyl, cycloalkyl of 3 to 6 carbon atoms, alkenyl of 3 to 6 carbon atoms having the vinyl unsaturation in other than the 1-position of the alkenyl group, or each set of $R^1$ and $R^2$ taken together with the nitrogen atom to which they are attached is a saturated monocyclic heterocyclic; or each X is (B) the group

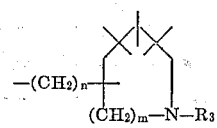

wherein $n$ is an integer of 0 to 2, $m$ is 1 or 2 and $R^3$ is hydrogen, (lower) alkyl, or alkenyl of 3 to 6 carbon atoms having the vinyl unsaturation in other than the 1-position of the alkenyl group; or a pharmaceutically acceptable acid addition salt of said base. The compounds of this invention have antiviral activity and can be administered to warm-blooded animals for the prevention or treatment of a viral disease. The compounds of this invention cover both the free base form or simply bases and non-toxic or pharmaceutically acceptable acid addition salts of such bases.

This invention relates to novel compounds and to processes for their preparation. More particularly, this invention relates to compounds having a fluoranthene nucleus which is substituted with two aminoalkyl ester or aminoalkyl thioester-containing side chains.

To applicants' knowledge, the fluoranthenes of this invention are novel compounds. What appears to applicants to be the closest prior art relates to the preparation of 3,8- and 3,9-dicarboxylic acid derivatives of fluoranthene and their methyl esters which are disclosed in: J. Von Braun et al., Ann., 496, 170 (1932); N. Campbell et al., J. Chem. Soc., 1404 (1951); and N. Campbell et al., J. Chem. Soc., 2784 (1950). The prior art shows additional derivatives and particularly disulfonic and dicarboxylic acid derivatives such as those described in P. Bielawaski et al., Gaz 5(5), 185–8 (1960); Th. Halbro et al., J. Chem. Soc., 1957, 2652–3; B. Kaminska et al., Zesz. Nauk. Politech. Slask; Chem. No. 29, 3–10 (1966) (CA 66:28575); S. Burmestrov et al., CA 63:8523; and N. Campbell et al., J. Chem. Soc. (1951), 1404–6.

As can be seen from the above generic Formula I, one of the side chains

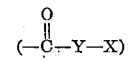

is on the benzene portion of the fluoranthene ring whereas the other is on the naphthalene portion of the fluoranthene ring.

Thus, one of the side chains can be linked to the fluoranthene ring by replacement of one of the hydrogen atoms in positions 1–6 of the fluoranthene ring. The second side chain replaces one of the hydrogen atoms in positions 7–10 of the fluoranthene ring. Preferably, the side chains are in the 3- and 8-positions or the 3- and 9-positions, respectively, of the fluoranthene ring. It will, of course, be recognized that the placement of the side chains in a number of different positions can relate to the same compound, e.g., the 4,8-substituted fluoranthene is the same as the 3,9-substituted compound.

It can be seen from the above Formula I and its description that the compounds can have structures wherein each X is the group

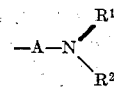

as more fully shown by the following generic Formula II or wherein X is the group

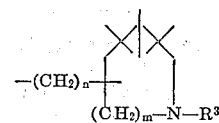

as more fully shown by generic Formula III below.

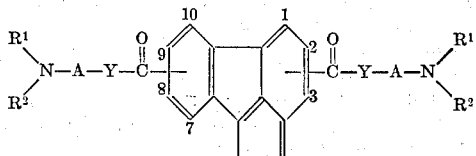

Formula II

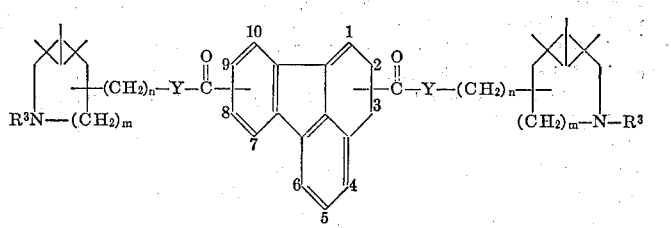

FORMULA III

Each of the letters Y in the above generic formulas can be oxygen or sulfur. Preferably, both of the Y groups for each compound are the same and particularly when both are oxygen.

Each of the letters A in the above Formula II is an alkylene group having from 2 to about 8 carbon atoms which can be straight chained, e.g., —$CH_2$—$(CH_2)_n$— wherein $n$ is an integer of 1 to 7, or branched chained and which separates the carboxyl group or carbothiolyl group from the amino nitrogen by an alkylene chain of at least two carbon atoms, i.e., the oxygen (or sulfur) and amino nitrogen are not on the same carbon atom of the alkylene group. Each of the alkylene groups as represented by A can be the same or different. Preferably both of these groups are the same. Illustrative of alkylene groups as represented by A there can be mentioned: 1,2 - ethylene; 1,3-propylene; 1,4 - butylene; 1,5 - pentylene; 1,6 - hexylene; 2 - methyl - 1,4 - butylene; 2 - ethyl - 1,4 - butylene; 3 - methyl - 1,5 - pentylene and the like. Preferably A is alkylene having from 2 to 6 carbon atoms.

Each amino group, i.e.,

of Formula II, can be a primary, secondary or tertiary amino group. Each of $R^1$ and $R^2$ can be hydrogen, (lower) alkyl, cycloalkyl of 3 to 6 carbon atoms, alkenyl of 3 to 6 carbon atoms having the vinyl unsaturation in other than the 1-position of the alkenyl group, or each set of $R^1$ and $R^2$ taken together with the nitrogen atom to which they are attached is a saturated monocyclic heterocyclic group.

The term (lower) alkyl as used herein relates to alkyls having from 1 to 6 carbon atoms. Illustrative of (lower) alkyls as can be represented by each $R^1$ or $R^2$ in Formula II or $R^3$ in Formula III there can be mentioned straight or branched chain alkyls such as: methyl; ethyl; n-propyl; isopropyl; n-butyl; secondary butyl; tertiary butyl; isoamyl; n-pentyl; n-hexyl; and the like.

Illustrative of cycloalkyl groups as represented by each of $R^1$ or $R^2$ there can be mentioned: cyclopropyl; cyclobutyl; cyclopentyl; cyclohexyl; and the like.

When $R^1$, $R^2$, or $R^3$ represents an alkenyl group, the vinyl unsaturation is in other than the 1-position of said alkenyl group. Illustrative of alkenyl groups as can be represented by $R^1$, $R^2$, or $R^3$, there can be mentioned: allyl; 3-butenyl; 4-hexenyl; and the like.

The heterocyclic groups of each set of $R^1$ and $R^2$ together with the nitrogen atom to which they are attached can be a saturated monocyclic heterocyclic group such as those generally equivalent to di(lower)alkylamino groups in the pharmaceutical arts. Illustratively, such groups, in addition to the one nitrogen atom, can contain a second hetero atom, i.e., oxygen, sulfur or nitrogen, in the ring, and 4 or 5 ring carbon atoms. The ring can be substituted with a (lower) alkyl group, particularly such an alkyl group having from 1 to 3 carbon atoms. Illustrative of specific heterocyclic groups as represented by $R^1$ and $R^2$ together with the nitrogen atom to which they are attached, there can be mentioned: piperidino, pyrrolidino, N - (lower) alkylpiperazino such as N - methyl or N - ethylpiperazino, and the like.

Each $R^1$, $R^2$ or $R^3$ group can be the same or different on each of the side chains of the fluoranthene ring. Thus, one of the $R^1$ groups can be alkyl whereas the other can be cycloalkyl, both $R^1$ groups can be alkyl and one or both of the $R^2$ groups can be alkenyl, one set of $R^1$ and $R^2$ together with the nitrogen to which they are attached can be a heterocyclic whereas the remaining $R^1$ and $R^2$ can be alkyls. Further, other variations can be made. Preferably, however, both of the $R^1$ groups, $R^2$ groups, or $R^3$ groups are the same. Preferred substituents for the $R^1$, $R^2$ and $R^3$ groups are the alkyls, which again can be the same or different alkyl radicals, but particularly the same radical for the total of the four $R^1$ and $R^2$ groups in the Formula II compounds or the total of two $R^3$ groups in the Formula III compounds.

It can be seen from the above Formula III that each of the saturated heterocyclic groups can be attached to Y through an alkylene linkage of 1 or 2 carbon atoms, e.g., methylene, 1,2 - ethylene, or the saturated heterocyclic group can be attached to Y through a ring carbon atom of such heterocyclic group when $n$ is zero. The heterocyclic groups in the Formula III compounds can be 5- or 6-membered rings, i.e., $m$ is 1 or 2. The $R^3$ groups can be the same as the $R^1$ or $R^2$ groups of the Formula II compounds, except for cycloalkyl or heterocycles. Illustrative of various groups as represented by

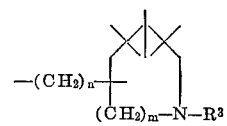

there can be mentioned: N - methyl - 4 - piperidyl, N-ethyl - 3 - pyrrolidyl, N - alkyl - 4 - piperidylmethyl, N-methyl - 3 - piperidylmethyl, 2 - (2 - piperidylethyl), and the like.

Illustrative of base compounds of this invention as represented by generic Formula II there can be mentioned:

bis(4-aminobutyl) fluoranthene-3,9-dicarboxylate;
bis(4-aminobutyl) fluoranthene-3,9-dicarbothiolate;
bis(2-diethylaminoethyl) fluoranthene-3,9-dicarboxylate;
bis(3-diethylaminopropyl) fluoranthene-3,9-dicarboxylate;
bis(3-dibutylaminopropyl) fluoranthene-3,9-dicarboxylate;
bis(3-diethylaminopropyl) fluoranthene-3,9-dicarbothiolate;
bis(5-dipropylaminopentyl) fluoranthene-3,9-dicarboxylate;
bis(3-cyclohexylaminopropyl) fluoranthene-3,9-dicarboxylate;
bis(6-diallylaminohexyl) fluoranthene-3,9-dicarboxylate;
bis(3-pyrrolidinopropyl) fluoranthene-3,9-dicarboxylate;

bis(3-pyrrolidinopropyl) fluoranthene-3,9-dicarbothiolate;
bis[2-(N-methyl-N-cyclohexylamino)ethyl] fluoranthene-3,9-dicarboxylate; the corresponding 3,8-derivatives of the above enumerated bases; and the like. Illustrative of base compounds of this invention as represented by the generic Formula III, there can be mentioned:

bis[2-(N-methyl-4-piperidyl)ethyl] fluoranthene-3,9-dicarboxylate;
bis(N-methyl-4-piperidyl) fluoranthene-3,9-dicarboxylate;
bis(N-ethyl-3-pyrrolidyl) fluoranthene-3,9-dicarboxylate;
bis(N-allyl-4-piperidylmethyl) fluoranthene-3,8-dicarboxylate; and the like.

Preferred fluoranthenes of this invention are those of generic Formula II which can be represented by the formula

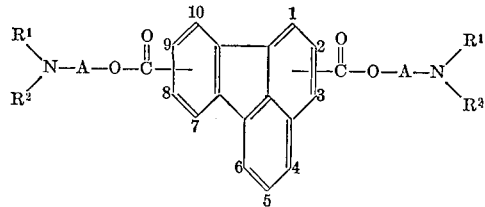

wherein each A is alkylene of 2–6 carbon atoms, each $R^1$ and $R^2$ is alkyl of 1–5 carbon atoms, one of the dialkyl-aminoalkyleneoxycarbonyl side chains is in the 3-position of the fluoranthene ring whereas the other or remaining side chain is in the 8- or 9-position of the fluoranthene ring.

Salts of the base compounds of this invention are primarily pharmaceutically acceptable acid addition salts with inorganic or organic acids. Suitable inorganic acids are, for example, mineral acids, such as hydrohalic acids, e.g., hydrochloric or hydrobromic acid, or sulfuric or phosphoric acids. Organic acids are, for example, lower aliphatic hydrocarbon monocarboxylic acids, e.g., glycolic or lactic acid and the like, lower aliphatic lower alkoxy-hydrocarbon monocarboxylic acids, e.g., methoxy-acetic or ethoxy-acetic acids and the like, lower aliphatic lower alkanoyl-hydrocarbon monocarboxylic acids, e.g., pyruvic acid and the like, lower aliphatic hydrocarbon dicarboxylic acids, e.g., oxalic, malonic, succinic, methylsuccinic, dimethylsuccinic, glutaric, α-methylglutaric, β-methylglutaric, itaconic, maleic, citraconic, homocitraconic, or fumaric acid and the like, lower aliphatic hydroxy hydrocarbon dicarboxylic acids, e.g., malic or tartaric acid and the like, lower aliphatic lower alkoxy-hydrocarbon dicarboxylic acids, e.g., α,β-dimethoxysuccinic or ethoxy-maleic acid and the like, lower aliphatic hydrocarbon tricarboxylic acids, e.g., aconitic or tricarballylic acid and the like, lower aliphatic hydroxy-hydrocarbon tricarboxylic acids, e.g., citric acid and the like. Furthermore organic sulfonic acids, such as lower alkane sulfonic acids, e.g., methane sulfonic or ethane sulfonic acid and the like, or lower hydroxy-alkane sulfonic acids, e.g., 2-hydroxy-ethane sulfonic acid and the like, may be suitable. Particularly useful are pharmacologically acceptable acid addition salts with mineral acids, e.g., hydrochloric acid. Mono- or di-acid salts may be formed; also, the salts can be hydrated, e.g., monohydrate, or substantially anhydrous.

The fluoranthene compounds of this invention can be administered for their antiviral effect to animals, for example, warm-blooded animals, by conventional techniques. The compounds of this invention can be administered to animals for their prophylactic or therapeutic effects by conventional modes of administration, either alone but preferably with pharmaceutical carriers. Illustratively, administration can be parenterally, e.g., subcutaneously, topically, or orally. The dosage administered will be dependent upon the virus for which treatment of prophylaxis is desired, the type of animal involved, and similar considerations. Generally, a daily dosage of the active ingredient can be from less than about 2 to over 250 mg. (milligram) per kg. (kilogram) of body weight. The novel compounds together with conventional) pharmaceutical carriers can be employed in unit dosage forms such as solids, for example, tablets or capsules, or liquid solutions, suspensions, or elixirs for oral administration and ingestion or liquid solutions for parenteral use. The quantity of active ingredient in each dosage will generally differ depending on the type of unit dosage, the type of animal and its weight. Thus, each dosage can contain from less than about 0.1 mg. to over 250 mg. of active ingredient in a significant quantity of pharmaceutical carrier. Preferably the compounds are administered subcutaneously at the above indicated dosages daily, for a period of time extending from a day or two prior to invasion of the animal by the virus and such administration is continued for a day or two after such invasion.

The compounds of this invention can be used as antiviral agents in the treatment or prophylaxis of a wide variety of viral diseases or infections. Illustratively, the compounds can be used for their antiviral effect against picornavirus types, myxoviruses, poxviruses, and the like.

The preparation of the compounds in this invention can be achieved by a variety of procedures including:

(1) The reaction of a fluoranthene dicarboxylic acid or a reactive derivative thereof, such as an acid halide or ester of the formula:

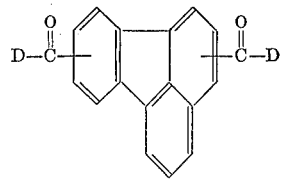

wherein D represents an OH group, a halogen or a (lower) alkoxy group, or the like with an aminoalkanol or an aminoalkylthiol of the formula:

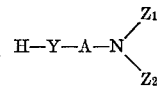

wherein Y is oxygen or sulfur, A is alkylene of 2 to about 8 carbon atoms, and each of $Z_1$ and $Z_2$ has the same meaning as $R^1$ and $R^2$ in Formula II, except that neither $Z_1$ nor $Z_2$ can be hydrogen. The secondary or primary amino derivatives of Formula II can be prepared by a similar reaction to the above, if the amino group of the aminoalkanol or aminoalkylthiol is suitably blocked to reactivity by formation of a salt or, preferably, by substituting it with a readily removable blocking group such as trifluoroacetyl, carbobenzoxy or the like, followed by removal of the blocking group with a suitable technique such as mild acid hydrolysis or catalytic reduction.

The esterification may be achieved by allowing the fluoranthene dicarboxylic acid, where D in the above formula is hydroxy, to react with the appropriate aminoalkanol or aminoalkylthiol in an inert solvent in the presence of a catalyst and employing general methods for removing water from the reaction site. Preferred solvents are chloroform, isopropanol, dioxane, toluene and the like. The reaction may be performed if the amino group of the aminoalkanol or aminoalkylthiol is suitably blocked from reactivity by formation of a salt, e.g., with mineral acids such as hydrochloric or sulfuric or certain organic acids such as p-toluenesulfonic acid. The catalyst can be one of the acids used for blocking the amino group. The quantity of acid used as catalyst can be 0.1 mole or less per mole of the blocked amino group. Methods whereby water can be removed from the reaction include the use of water scavengers such as the carbodiimides or by the azeotropic removal of water. The reaction will proceed over a wide temperature range, e.g., from about 50° C. to 150° over a wide period of time, e.g., from about 6 to 72 or more hours depending upon the solvent and catalyst.

Alternatively, the esterification may be achieved by allowing the acid halide, including chlorine or bromine, where D in the above formula is halogen, e.g., chlorine or bromine, to react with the appropriate aminoalkanol or aminoalkylthiol. The compounds of this invention can be produced in a variety of inert solvents over a wide range of temperatures and reaction time. The solvents of choice include chloroform, dioxane, tetrahydrofuran, and the aromatic solvents such as benzene, toluene and the like. In chloroform, the reaction is generally complete within one hour at the reflux temperature of the solvent although the reaction time can range from 15 minutes to 3 days.

The compounds of this invention may also be produced by a transesterification reaction in which a lower alkoxy ester of fluoranthene dicarboxylic acid, where D, for example, is methoxy or ethoxy in the above formula, is caused to react with the appropriate aminoalkanol or aminoalkylthiol under suitable conditions. This type of reaction is catalyzed by alkaline or acid catalysts and is reversible. The compounds of this invention may be produced by causing the equilibrium to be shifted by removing the lower alkanol component or by employing a large excess of the aminoalkanol or aminoalkylthiol. Preferably, the reaction is carried out by removing the lower alkanol component with the use of an alkaline catalyst. The lower alkanol may be removed by direct distillation or distillation with a suitable solvent. Suitable alkaline catalysts are alkali metals, sodium or potassium; alkali lower alkoxides, such as sodium methoxide or sodium ethoxide; alkali amides such as lithium or sodium amide; etc. Suitable solvents are those forming an azeotropic distillation mixture with the lower alkanol, for example, benzene or toluene, or a solvent which boils sufficiently higher than the alkanol to permit removal of the alkanol by distillation at a temperature below that of the boiling range of the solvent.

(2) The reaction of a fluoranthene dicarboxylic acid or reactive salt thereof, such as the sodium or silver salt with an aminoalkyl halide or reactive ester of an aminoalkanol such as the aminoalkyl-p-toluene sulfonate or salts thereof where the aminoalkyl portion is defined as above. The reaction conditions can vary over a wide range such as from about 6 hours to 5 days over a temperature range of from about room temperature to the reflux temperature of the solvent employed in the presence or absence of an activating moiety such as inorganic cations including sodium and silver or organic activators such as benzyltrimethylammonium chloride. These activators may be present in stoichiometric amounts or catalytic quantities. Since these activators considerably reduce the reaction time, the preferred conditions are to use a catalytic amount of benzyltrimethylammonium chloride and allow the reaction to proceed for about 6–18 hours at the reflux temperature of isopropanol.

(3) The reaction of a fluoranthene ω-haloalkyl diester of the formula:

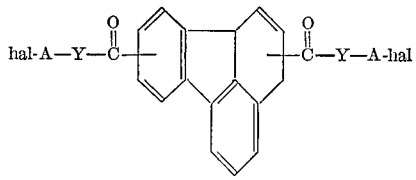

wherein hal is chlorine, bromine or iodine and A and Y are as previously defined, with an amine of the formula:

wherein each of $R^3$ and $R^4$ is alkyl of 1 to about 6 carbon atoms, or together with the nitrogen to which they are attached is a heterocyclic group such as that generally equivalent to a dialkylamino group. The fluoranthene ω-haloalkyl diester may be prepared by the reaction of the fluoranthene dicarbonyl chloride with an ω-halo alkanol or thiol in a suitable solvent such as chloroform. The preferred halogen in the above formula is bromie or iodine. The reaction is conducted in the presence of stoichiometric amounts of a material which will effectively remove the acid generated in the course of the reaction. Suitable acid binding reagents are anhydrous sodium or potassium carbonate or extra equivalents of the amine. The solvents of choice are nonprotonic organic liquids such as toluene, chloroform, diethyl ether and dioxane. The preferred conditions are those in which components are allowed to react in toluene at 25 to 100° for 24 to 72 hours in the presence of potassium carbonate.

It will be recognized that the above methods are described with particular reference to compounds of Formula II. However, by use of the appropriate amino alcohol intermediate, the compounds of Formula III can be prepared. Thus, N-methyl-4-hydroxypiperidine reacts as an aminoalkanol; N-ethyl-3-chloropyrrolidine reacts as an aminoalkyl halide; etc.

The following examples are illustrative of the invention.

EXAMPLE 1

Preparation of bis(3-diethylaminopropyl) fluoranthene-3,9-dicarboxylate dihydrochloride To 300 ml. of chloroform were added 4.4 g. of fluoranthene-3,9-dicarbonyl chloride and 3.51 g. of 3-diethylaminopropanol and the resulting solution was refluxed for one hour. After cooling, the subject compound, as a yellow solid product, crystallized from the reaction solvent, was filtered, washed with ether and crystallized from methanol ethyl acetate, M.P. 258–260° C., $\lambda_{max.}^{EtOH}$ 299, $E_{1cm.}^{1\%}$ 718.

EXAMPLE 2

Preparation of bis(3-piperidinopropyl) fluoranthene-3,8-dicarboxylate dihydrochloride To 400 ml. of chloroform was added 15.0 g. (0.046 mole) of fluoranthene-3,8-dicarbonyl chloride and 13.3 g. (0.093 mole) of 3-piperidinopropanol and the resulting solution was heated at reflux. After a short time, the product separated from the refluxing reaction mixture and after refluxing for a total time of 3 hours, the subject compound, as a yellow product, was separated by filtration and crystallized twice from methanol-ethyl acetate, M.P. 258–260° C., $\lambda_{max.}^{CH3OH}$ 229, $E_{1cm.}^{1\%}$ 578.

EXAMPLE 3

Preparation of bis(3-diethylaminopropyl) fluoranthene-3,8-dicarboxylate dihydrochloride To 1 liter of chloroform was added 15.0 g. (0.046 mole) of fluoranthene-3,8-dicarbonyl chloride and 12.2 g. (0.093 mole) of 3-diethylaminopropanol. During the addition of the latter reagent, a mildly exothermic reaction was noted. After about 15 minutes at reflux, the subject compound, as a yellow solid, appeared. The reaction mixture was refluxed overnight, cooled and the yellow product was filtered and crystallized from methanol-ethyl acetate, M.P. 259–261° C., $\lambda_{max.}^{CH3OH}$ 229, $E_{1cm.}^{1\%}$ 661.

EXAMPLE 4

Preparation of bis(3-diisopentylaminopropyl) fluoranthene-3,8-dicarboxylate dihydrochloride To 700 ml. of chloroform was added 10 g. (0.033 mole) of fluoranthene-3,8-dicarbonyl chloride and 14.2 g. (0.066 mole) of 3-diisopentylaminopropanol and the solution was refluxed for 3½ hours. The solution was concentrated, diluted with 400 ml. of ethyl acetate, 300 ml. of anhydrous ether and on cooling, the subject compound, as a yellow product, separated. The product was crystallized once from acetone and finally from butanone, M.P. 168–171°, $\lambda_{max.}^{EtOH}$ 229 $E_{1cm.}^{1\%}$ 500.

EXAMPLE 5

Preparation of bis(3-dibutylaminopropyl) fluoranthene-3,8-dicarboxylate dihydrochloride hemihydrate To 700 ml. of chloroform was added 10.0 g. (0.033 mole) of fluoranthene-3,8-dicarbonyl chloride and 12.4 g.

(0.066 mole) of 3-dibutylaminopropanol and the resulting solution was refluxed overnight. The subject product was crystallized from chloroform-ethyl acetate and twice from methanol-ethyl acetate. Further purification was achieved by dissolving the product in water with subsequent conversion of the product to the free base by the action of cold 3 N aqueous potassium hydroxide, extraction of the free base with ether and after drying the ether solution converting the basic ester to the dihydrochloride salt with ethereal-hydrogen chloride. The product was crystallized from methanol-butanone-ether, M.P. 169–173°, $$\lambda_{max.}^{EtOH}\ 229,\ E_{1\,cm.}^{1\%}\ 530.$$

EXAMPLE 6

Preparation of bis(3-diallylaminopropyl) fluoranthene-3,8-dicarboxylate dihydrochloride To 400 ml. of chloroform was added 11.0 g. (0.034 mole) of fluoranthene-3,8-dicarbonyl chloride and 10.7 g. (0.068 mole) of 3-diallylaminopropanol and the solution was refluxed for 6 hours. The cloudy solution was filtered through dicalite and diluted with 500 ml. of ether. The resulting subject compound, as a yellow solid product, was crystallized from methanol-acetone-ether, M.P. 216.5–219° C., $$\lambda_{max.}^{H_2O}\ 229,\ E_{1\,cm.}^{1\%}\ 553.$$

EXAMPLE 7

Preparation of bis(3-piperidinopropyl) fluoranthene-3,9-dicarboxylate dihydrochloride To 500 ml. of chloroform was added 9.8 g. (0.03 mole) of fluoranthene-3,9-dicarbonyl chloride and 8.6 g. (0.06 mole) of 3-piperidinopropanol and the reaction mixture was refluxed for 3 hours. Precipitation occurred during the reaction and after cooling, the subject compound was separated by filtration, washed with ether and air dried. This product was purified by conversion to the free base and reconversion to the dihydrochloride salt by the procedure described in Example 5. The product was crystallized from methanol-ethyl acetate, M.P. 247–250°, $$\lambda_{max.}^{EtOH}\ 300,\ E_{1\,cm.}^{1\%}\ 680.$$

EXAMPLE 8

Preparation of bis(3-dipropylaminopropyl) fluoranthene-3,9-dicarboxylate dihydrochloride To 500 ml. of chloroform was added 9.8 g. (0.03 mole) of fluoranthene-3,9-dicarbonyl chloride and 9.56 g. (0.06 mole) of 3-dipropylaminopropanol and the resulting solution was refluxed for 4 hours. On cooling, the product separated and was crystallized from methanol-ethyl acetate, M.P. 247–249° C., $$\lambda_{max.}^{EtOH}\ 299,\ E_{1\,cm.}^{1\%}\ 655.$$

EXAMPLE 9

Preparation of bis(3-diallylaminopropyl) fluoranthene-3,9-dicarboxylate

To 500 ml. of chloroform was added 9.8 g. (0.03 mole) of fluoranthene-3,9-dicarbonyl chloride and 9.3 g. (0.06 mole) of 3-diallylaminopropanol and the solution was refluxed for 16 hours. The dihydrochloride salt was converted to the free base by treating the chloroform solution with saturated aqueous sodium bicarbonate, separation of the organic and water layer, drying the organic layer over anhydrous magnesium sulfate and finally removing the solvent in vacuo. The residue was dissolved in butanone and acidified with ethereal hydrogen chloride. The salt was crystallized twice from methanol-butanone or water-methanol-butanone, M.P. 229–231° C. and converted back to the free base to give a yellow viscous oil of the subject compound, $$\lambda_{max.}^{0.1\ NHCl}\ 299\ m\mu,\ E_{1\,cm.}^{1\%}\ 605.$$

EXAMPLE 10

Preparation of bis(3-dibutylaminopropyl) fluoranthene-3,9-dicarboxylate

To 400 ml. of chloroform was added 9.8 g. (0.03 mole) of fluoranthene-3,9-dicarbonyl chloride and 11.2 g. (0.06 mole) of 3-dibutylaminopropanol and the solution was refluxed for 4 hours. Purification was accomplished by the method described in Example 9. The dihydrochloride salt melted at 211.5–213° C. and conversion to the free base gave the yellow viscous oil of the subject compound $$\lambda_{max.}^{0.1\ NHCl}\ 299,\ E_{1\,cm.}^{1\%}\ 541.$$

EXAMPLE 11

Preparation of bis(2-diethylaminoethyl) fluoranthene-3,9-dicarboxylate

To 400 ml. of chloroform was added 9.8 g. (0.03 mole) of fluoranthene-3,9-dicarbonyl chloride and 7.0 g. (0.06 mole) of 2-diethylaminoethanol and the solution was refluxed for 4 hours. Purification was accomplished by the method described in Example 9. The dihydrochloride salt of the subject compound melted at 250–252° C. and conversion to the free base gave the base compound as a yellow viscous oil, $$\lambda_{max.}^{0.1\ NHCl}\ 299,\ E_{1\,cm.}^{1\%}\ 706.$$

EXAMPLE 12

Preparation of bis(N-methyl-4-piperidyl) fluoranthene-3,9-dicarboxylate

To 400 ml. of chloroform was added 9.8 g. (0.03 mole) of fluoranthene-3,9-dicarbonyl chloride and 6.85 g. (0.06 mole) of 4-hydroxy-N-methylpiperidine and solution was refluxed for 4 hours. Purification was accomplished by the method described in Example 9. The dihydrochloride salt of the subject compound melted at 222–229° C. and conversion to the free base followed by column chromatography gave the product as a yellow solid, M.P. 152–154° C., $$\lambda_{max.}^{0.1\ NHCl}\ 299,\ E_{1\,cm.}^{1\%}\ 758.$$

EXAMPLE 13

Preparation of bis(4-diethylaminobutyl) fluoranthene-3,9-dicarboxylate dihydrochloride monohydrate To 300 ml. of chloroform was added 5.6 g. (0.017 mole) of fluoranthene-3,9-dicarbonyl chloride and 5.0 g. (0.034 mole) of 4-diethylaminobutanol and the solution was refluxed for 4 hours. The product was crystallized from chloroform-ether and from methanol-ethyl acetate to give the monohydrate, M.P. 205–209° C.

$$\lambda_{max.}^{EtOH}\ 299,\ E_{1\,cm.}^{1\%}\ 669.$$

EXAMPLE 14

Preparation of bis(3-dipentylaminopropyl) fluoranthene-3,9-dicarboxylate

To 400 ml. of chloroform was added 9.8 g. (0.03 mole) of fluoranthene-3,9-dicarbonyl chloride and 18.9 g. (0.06 mole) of 3-dipentylaminopropanol and the solution was refluxed for 16 hours. Purification was accomplished by the method described in Example 9. The dihydrochloride salt of the subject base melted at 148–151° C. and conversion to the free base as a yellow viscous oil after column chromatography, $$\lambda_{max.}^{CHCl_3}\ 301,\ E_{1\,cm.}^{1\%}\ 643.$$

EXAMPLE 15

Preparation of bis(3-diisopentylaminopropyl) fluoranthene-3,9-dicarboxylate dihydrochloride To 400 ml. of chloroform was added 9.8 g. (0.03 mole) of fluoranthene-3,9-dicarbonyl chloride and 19.9 g. (0.06 mole) of 3-diisopentylaminopropanol and the solution was refluxed for 18 hours. Purification was accomplished by the method described in Example 9. The subject compound, as a yellow powder, was crystallized from methanol-butanone, M.P. 246–248.5° C., $\lambda_{max.}^{H_2O}$ 299, $E_{1cm.}^{1\%}$ 434.

EXAMPLE 16

Preparation of bis[5-(dimethylamino)-2,2-dimethylpentyl]fluoranthene-3,9-dicarboxylate dihydrochloride To 400 ml. of chloroform was added 9.8 g. (0.03 mole) of fluoranthene-3,9-dicarbonyl chloride and 9.5 g. (0.06 mole) of 5-dimethylamino-2,2-dimethylpentanol and the solution was refluxed for 18 hours. Purification was accomplished by the method described in Example 9. The subject compound was crystallized three times from methanolbutanone, M.P. 246–248.5° C., $\lambda_{max.}^{H_2O}$ 299, $E_{1cm.}^{1\%}$ 508.

EXAMPLE 17

Preparation of bis(3-dimethylaminopropyl) fluoranthene-3,9-dicarboxylate dihydrochloride hemihydrate To 400 ml. of chloroform was added 9.8 g. (0.03 mole) of fluoranthene-3,9-dicarbonyl chloride and 10.2 g. (0.06 mole) of 3-dimethylaminopropanol and the solution was refluxed for 16 hours. Purification was accomplished by the method described in Example 9. The subject compound was crystallized three times from methanol-butanone, M.P. 242.5–244° C., $\lambda_{max.}^{H_2O}$ 299 m$\mu$, $E_{1cm.}^{1\%}$ 641.

EXAMPLE 18

Preparation of bis(2-diethylaminoethyl) fluoranthene-3,9-dicarbothiolate dihydrochloride To 400 ml. of chloroform was added 9.8 g. (0.03 mole) of fluoranthene-3,9-dicarbonyl chloride and 10.2 g. (0.06 mole) of 2-diethylaminoethanethiol and the solution was refluxed for 16 hours. Purification was accomplished by the method described in Example 9. The subject compound was crystallized three times from methanol-butanone, M.P. 259.5–261.5° C., $\lambda_{max.}^{H_2O}$ 307 m$\mu$, $E_{1cm.}^{1\%}$ 681.

EXAMPLE 19

Preparation of fluoranthene-3,9-dicarbonyl chloride

A mixture of 3000 ml. of thionyl chloride, 200 g. of fluoranthene-3,9-dicarboxylic acid, prepared by the method of Campbell, [J. Chem. Soc., 1404 (1951)], and 10 ml. of dry pyridine was heated at reflux for 16 hours. The excess thionyl chloride was removed by distillation and the last trace was removevd by azeotropic distillation with dry toluene. The subject compound was crystallized from dry toluene, M.P. 206–209° C.

EXAMPLE 20

Preparation of fluoranthene-3,8-dicarbonyl chloride

A mixture of 250 ml. of thionyl chloride, 20.5 g. of fluoranthene-3,8-dicarboxylic acid, prepared by the method of Campbell, [J. Chem. Soc., 2748 (1950)] and 0.5 ml. of N,N-dimethylcyclohexylamine was refluxed for 4 hours. The subject compound, M.P. 222–227° C., was collected by the procedure as described in Example 19.

EXAMPLE 21

Preparation of bis(5-amino-2,2-dimethylpentyl) fluoranthene-3,9-dicarboxylate dihydrochloride A solution of 2 equivalents of 5-amino-2,2-dimethyl-1-pentanol, as the dihydrochloride salt and 1 equivalent of fluoranthene-3,9-dicarbonyl chloride in a sufficient volume of chloroform is refluxed for several hours. The product, bis(5-amino-2,2-dimethylpentyl) fluoranthene-3,9-dicarboxylate dihydrochloride can be purified by recrystallization from methanol-ethyl acetate.

EXAMPLE 22

Preparation of bis(5-ethylamino-2,2-dimethylpentyl) fluoranthene-3,9-dicarboxylate dihydrochloride This secondary amine can be prepared by the above procedure by employing the N-ethyl derivative of 5-amino-2,2-dimethyl-1-pentanol.

EXAMPLE 23

Preparation of bis(3-diethylaminopropyl) fluoranthene-3,9-dicarboxylate dihydrochloride An isopropyl alcohol solution of 1 equivalent of fluoranthene-3,9-dicarboxylic acid and 4 equivalents of 3-diethylaminopropylchloride containing a catalytic amount of benzyltrimethylammonium chloride is refluxed for 2–4 hours and the product crystallized by the addition of anhydrous ether. Purification is effected by recrystallization from methanol-ethyl acetate.

EXAMPLE 24

Preparation of bis(3-diethylaminopropyl) fluoranthene-3,9-dicarboxylate dihydrochloride A toluene solution of 1 equivalent of dimethyl fluoranthene-3,9-dicarboxylate and 2.2 equivalents of 3-diethylaminopropanol containing a catalytic amount (ca. 0.1 equivalent) of sodium methoxide is slowly distilled under an efficient distillation column until the rise in temperature of distillation indicates complete removal of the methanol being formed. Several periods of alternate reflux and distillation may be used rather than continuous slow distillation. The product is isolated by diluting the cooled reaction mixture with ether, washing several times with water, drying over anhydrous sodium sulfate, and precipitation of the dihydrochloride salt with ethereal hydrogen chloride. The precipitated salt is collected and recrystallized from methanol-ethyl acetate.

EXAMPLE 25

Preparation of bis(3-diethylaminopropyl) fluoranthene-3,9-dicarboxylate dihydrochloride To a chloroform solution of 1 equivalent bis(3-bromopropyl) fluoranthene-3,9-dicarboxylate, prepared from fluoranthene-3,9-dicarbonyl chloride and 3-bromopropanol, is added 5 equivalents of diethyl amine and the solution is refluxed with stirring overnight. The product is isolated by thorough washing with water, drying the solvent solution and precipitating with ethereal HCl. It is purified by recrystallization from methanol-ethyl acetate.

EXAMPLE 26

Preparation of bis(N-methyl-3-piperidylmethyl) fluoranthene-3,9-dicarboxylate dihydrochloride A chloroform solution of 1 equivalent of fluoranthene-3,9-dicarbonyl chloride and 2 equivalents of 3-hydroxymethyl-N-methylpiperidine is refluxed for four hours and the product crystallized by the addition of anhydrous ether. Purification is effected by recrystallization from methanol-ethyl acetate.

Examples 27 to 48 illustrate in vivo antiviral studies with compounds, also referred to as active ingredients, of this invention. In each of the examples the compounds were antivirally active. In Examples 27 to 29 and 31 to 48 the compounds showed antiviral activity by prolonging the mean day of death of the treated animals as compared to the control animals, during the period of observation. In Example 30 antiviral activity was shown by fewer lesions for the treated animals as compared to the controls, during the period of observation. The dosage levels of the compounds used in the examples were within the range of 2 to 250 mg./kg. of animal body weight. Table A lists the active ingredient which was administered in each of the examples. Although it is believed that the headings in the examples are self-explanatory, some of the headings are explained as follows: The "Challenge," i.e., inoculation with a virus, used in generally fatal to all the untreated, i.e., control, animals in the experiment. "Time of death" refers to the average time of death for the untreated animals. The "Treatment" was prophylactic or therapeutic or both. The term "volume" refers to the volume of composition administered per dose which contained the active ingredient dissolved in sterile water which also contained 0.15% of hydroxyethylcellulose. The control animals received a sham dosage of the same volume of the vehicle which did not contain the active ingredient.

TABLE A

| Example | Compound |
|---|---|
| 27–30 | Bis(3-diethylaminopropyl) fluoranthene-3,9-dicarboxylate dihydrochloride. |
| 31 | Bis(3-piperidinopropyl) fluoranthene-3,8-dicarboxylate dihydrochloride. |
| 32 | Bis(3-piperidinopropyl) fluoranthene-3,8-dicarboxylate dihydrochloride. |
| 33 | Bis(3-diethylaminopropyl) fluoranthene-3,8-dicarboxylate dihydrochloride. |
| 34 | Bis(3-diisopentylaminopropyl) fluoranthene-3,8-dicarboxylate dihydrochloride. |
| 35 | Bis(3-dibutylaminopropyl) fluoranthene-3,8-dicarboxylate dihydrochloride hemihydrate. |
| 36 | Bis(3-diallylaminopropyl) fluoranthene-3,8-dicarboxylate dihydrochloride. |
| 37 | Bis(3-piperidinopropyl) fluoranthene-3,9-dicarboxylate dihydrochloride. |
| 38 | Bis(3-dipropylaminopropyl) fluoranthene-3,9-dicarboxylate dihydrochloride. |
| 39 | Bis(3-diallylaminopropyl) fluoranthene-3,9-dicarboxylate. |
| 40 | Bis(3-dibutylaminopropyl) fluoranthene-3,9-dicarboxylate. |
| 41 | Bis(2-diethylaminoethyl) fluoranthene-3,9-dicarboxylate. |
| 42 | Bis(N-methyl-4-piperidyl) fluoranthene-3,9-dicarboxylate. |
| 43 | Bis(4-diethylaminobutyl) fluoranthene-3,9-dicarboxylate dihydrochloride monohydrate. |
| 44 | Bis(3-dipentylaminopropyl) fluoranthene-3,9-dicarboxylate |
| 45 | Bis(3-diisopentylaminopropyl) fluoranthene-3,9-dicarboxylate dihydrochloride |
| 46 | Bis[5-(dimethylamino)-2,2-dimethylpentyl] fluoranthene-3,9-dicarboxylate dihydrochloride |
| 47 | Bis(3-dimethylaminopropyl) fluoranthene-3,9-dicarboxylate dihydrochloride hemihydrate |
| 48 | Bis(2-diethylaminoethyl) fluoranthene-3,9-dicarbothiolate dihydrochloride |

| Example | 27 | 28 | 29 | 30 |
|---|---|---|---|---|
| Virus | Encephalomyocarditis | PR$_8$ Influenza | PR$_8$ Influenza | Vaccinia IHD. |
| Type | RNA, Picornavirus | RNA, Myxovirus | RNA, Myxovirus | DNA, Poxvirus. |
| Challenge | 10 LD$_{50}$ | 16 LD$_{50}$ | 8 LD$_{50}$ | 25 LD$_{50}$. |
| Route | Subcutaneous | Intranasal | Intranasal | Subcutaneous in tail. |
| Time of death | 5 days | 5 days | 7 days | Tail lesion scored. |
| Period of observation | 10 days | 10 days | 10 days | On 7th day. |
| Animal | Mice | Mice | Mice | Mice. |
| Weight | 12–15 grams | 12–15 grams | 12–15 grams | 15 grams. |
| No. in treated group | 10 | 10 | 10 | 10. |
| No. in control group | 10 | 29 | 20 | 20. |
| Treatment | Prophylactic and therapeutic. | Prophylactic and therapeutic. | Prophylactic and therapeutic. | Prophylactic and therapeutic. |
| Route | Subcutaneous | Intraperitoneal | Subcutaneous | Subcutaneous. |
| Volume | 0.25 ml | 0.25 ml | 0.25 ml | 0.25 ml. |
| Time pre-challenge | 28, 22, 4 hours | 1 hour | 28, 22, 4 hours | 28, 22, 4 hours. |
| Time post-challenge | 2, 20, 26 hours | 3, 6, 24, 27 hours | 2, 20, 26 hours | 4, 22, 26 hours. |

| Example | 31 | 32 | 33 | 34 |
|---|---|---|---|---|
| Virus | Encephalomyocarditis | Encephalomyocarditis | Encephalomyocarditis | Encyphalomyocarditis. |
| Type | RNA, Picornavirus | RNA, Picornavirus | RNA, Picornavirus | RNA, Picornavirus. |
| Challenge | 7 LD$_{50}$ | 8 LD$_{50}$ | 7 LD$_{50}$ | 13 LD$_{50}$. |
| Route | Subcutaneous | Subcutaneous | Subcutaneous | Subcutaneous. |
| Time of death | 5 days | 5 days | 5 days | 5 days. |
| Period of observation | 10 days | 10 days | 10 days | 10 days. |
| Animal | Mice | Mice | Mice | Mice. |
| Weight | 12–15 grams | 12–15 grams | 12–15 grams | 12–15 grams. |
| No. in treated group | 10 | 10 | 10 | 10. |
| No. in control group | 30 | 20 | 30 | 30. |
| Treatment | Prophylactic and therapeutic. | Prophylactic and therapeutic. | Prophylactic and therapeutic. | Prophylactic and therapeutic. |
| Route | Subcutaneous | Oral | Subcutaneous | Subcutaneous. |
| Volume | 0.25 ml | 0.25 ml | 0.25 ml | 0.25 ml. |
| Time pre-challenge | 28, 22, 4 hours | 28, 22, 2 hours | 28, 22, 4 hours | 28, 22, 2 hours. |
| Time post-challenge | 2, 20, 26 hours | 2, 20, 26 hours | 2, 20, 26 hours | 2, 20, 26 hours. |

| Example | 35 | 36 | 37 | 38 |
|---|---|---|---|---|
| Virus | Encephalomyocarditis | Encephalomyocarditis | Encephalomyocarditis | Encephalomyocarditis. |
| Type | RNA, Picornavirus | RNA, Picornavirus | RNA, Picornavirus | RNA, Picornavirus. |
| Challenge | 35 LD$_{50}$ | 32 LD$_{50}$ | 35 LD$_{50}$ | 10 LD$_{50}$. |
| Route | Subcutaneous | Subcutaneous | Subcutaneous | Subcutaneous. |
| Time of death | 5 days | 5 days | 5 days | 5 days. |
| Period of observation | 10 days | 10 days | 10 days | 9 days. |
| Animal | Mice | Mice | Mice | Mice. |
| Weight | 12–15 grams | 12–15 grams | 12–15 grams | 12–15 grams. |
| No. in treated group | 10 | 10 | 10 | 10. |
| No. in control group | 30 | 20 | 30 | 30. |
| Treatment | Prophylactic and therapeutic. | Prophylactic and therapeutic. | Prophylactic and therapeutic. | Prophylactic and therapeutic. |
| Route | Subcutaneous | Subcutaneous | Subcutaneous | Subcutaneous. |
| Volume | 0.25 ml | 0.25 ml | 0.25 ml | 0.25 ml. |
| Time pre-challenge | 28, 22, 2 hours | 28, 22, 2 hours | 28, 22, 2 hours | 28, 22, 2 hours. |
| Time post-challenge | 2, 20, 26 hours | 2, 20, 26 hours | 2, 20, 26 hours | 2, 20, 26 hours. |

| Example | 39 | 40 | 41 | 42 | 43 |
|---|---|---|---|---|---|
| Virus | Encephalomyocarditis. | Encephalomyocarditis. | Encephalomyocarditis. | Encephalomyocarditis. | Encephalomyocarditis. |
| Type | RNA, Picornavirus | RNA, Picornavirus | RNA, Picornavirus | RNA, Picornavirus | RNA, Picornavirus. |
| Challenge | 10 $LD_{50}$ | 27 $LD_{50}$ | 27 $LD_{50}$ | 10 $LD_{50}$ | 10 $LD_{50}$. |
| Route | Subcutaneous 5 days | Subcutaneous 5 days | Subcutaneous 5 days | Subcutaneous 5 days | Subcutaneous 5 days. |
| Time of death | 5 days | 5 days | 5 days | 5 days | 5 days. |
| Period of observation | 9 days | 10 days | 10 days | 9 days | 9 days. |
| Animal | Mice | Mice | Mice | Mice | Mice. |
| Weight | 12–15 grams | 12–15 grams | 12–15 grams | 12–15 grams | 12–15 grams. |
| No. in treated group | 10 | 10 | 10 | 10 | 10. |
| No. in control group | 20 | 10 | 10 | 20 | 30. |
| Treatment | Proph. and therapeutic. | Proph. and therapeutic. | Proph. and therapeutic. | Proph. and therapeutic. | Proph. and therapeutic. |
| Route | Subcutaneous | Subcutaneous | Subcutaneous | Subcutaneous | Subcutaneous. |
| Volume | 0.25 ml | 0.25 ml | 0.25 ml | 0.25 ml | 0.25 ml. |
| Time pre-challenge | 28, 22, 2 hrs | 28, 22, 2 hrs | 28, 22, 2 hrs | 28, 22, 2 hrs | 28,22,2 hrs. |
| Time post-challenge | 2, 20, 26 hrs | 2, 20, 26 hrs | 2, 20, 26 hrs | 2, 20, 26 hrs | 2, 20, 26 hrs. |

| Example | 44 | 45 | 46 | 47 | 48 |
|---|---|---|---|---|---|
| Virus | Encephalomyocarditis. | Encephalomyocarditis. | Encephalomyocarditis. | Encephalomyocarditis. | Encephalomyocarditis. |
| Type | RNA, Picornavirus | RNA, Picornavirus | RNA, Picornavirus | RNA, Picornavirus | RNA, Picornavirus. |
| Challenge | 56 $LD_{50}$ | 31 $LD_{50}$ | 10 $LD_{50}$ | 10 $LD_{50}$ | 10 $LD_{50}$. |
| Route | Subcutaneous | Subcutaneous | Subcutaneous | Subcutaneous | Subcutaneous. |
| Time of death | 5 days | 5 days | 5 days | 5 days | 5 days. |
| Period of observation | 10 days | 9 days | 9 days | 9 days | 9 days. |
| Animal | Mice | Mice | Mice | Mice | Mice. |
| Weight | 12–15 grams | 12–15 grams | 12–15 grams | 12–15 grams | 12–15 grams. |
| No. in treated group | 10 | 10 | 10 | 10 | 10. |
| No. in control group | 20 | 20 | 30 | 30 | 30. |
| Treatment | Proph. and therapeutic. | Proph. and therapeutic. | Proph. and therapeutic. | Proph. and therapeutic. | Proph. and therapeutic. |
| Route | Subcutaneous | Subcutaneous | Subcutaneous | Subcutaneous | Subcutaneous. |
| Volume | 0.25 ml | 0.25 ml | 0.25 ml | 0.25 ml | 0.25 ml. |
| Time pre-challenge | 28, 22, 2 hrs | 28, 22, 2 hrs | 28, 22, 2 hrs | 28, 22, 2 hrs | 28, 22, 2 hrs. |
| Time post-challenge | 2, 20, 26 hrs | 2, 20, 26 hrs | 2, 20, 26 hrs | 2, 20, 26 hrs | 2, 20, 26 hrs. |

What is claimed is:

1. A compound selected from a base of the formula:

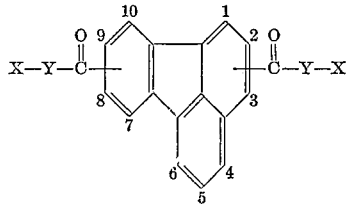

wherein: each Y is oxygen or sulfur and each X is:

(A) the group

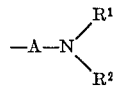

wherein each A is alkylene of 2 to about 8 carbon atoms and separates the amino nitrogen thereof and Y by an alkylene chain of at least 2 carbon atoms, each $R^1$ and $R^2$ is hydrogen, (lower) alkyl, cycloalkyl of 3 to 6 carbon atoms, alkenyl of 3 to 6 carbon atoms having the vinyl unsaturation in other than the 1-position of the alkenyl group, or each set of $R^1$ and $R^2$ taken together with the nitrogen to which they are attached is piperidine, pyrrolidine, or N-(loweralkyl) piperizino; or each X is (B) the group

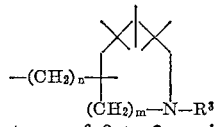

wherein n is an integer of 0 to 2, m is 1 or 2 and $R^3$ is hydrogen (lower) alkyl or alkenyl of 3 to 6 carbon atoms having the vinyl unsaturation in other than the 1-position of the alkenyl group; or a pharmaceutically acceptable acid addition salt of said base.

2. A compound selected from a base of the formula:

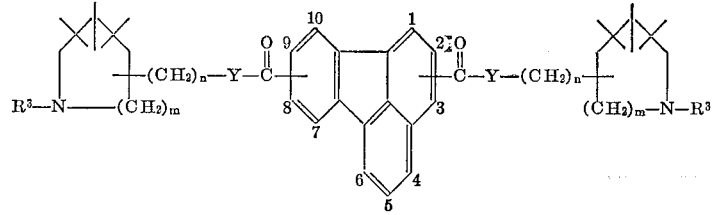

wherein: each Y is oxygen or sulfur; each n is an integer of 0 to 2; m is 1 or 2 and $R^3$ is hydrogen, (lower) alkyl, or alkenyl of 3 to 6 carbon atoms having the vinyl unsaturation in other than the 1-position of the alkenyl group; one of the side chains of the said formula is in the 3-position of the fluoranthene ring and the remaining of said side chains is in the 8- or 9-position of said fluoranthene ring; or a pharmaceutically acceptable acid addition salt of said base.

3. A compound of claim 2 wherein each Y is oxygen and $R^3$ is (lower) alkyl.

4. A compound selected from a base of the formula

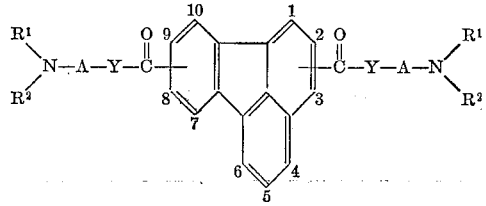

wherein: (A) each Y is oxygen or sulfur; (B) each A is alkylene of 2 to about 8 carbon atoms and separates the amino nitrogen and Y by an alkylene chain of at least 2 carbon atoms; (C) each $R^1$ and $R^2$ is hydrogen, (lower) alkyl, cycloalkyl of 3 to 6 carbon atoms, alkenyl of 3 to 6 carbon atoms having the vinyl unsaturation in other than the 1-position of the alkenyl group, or each set of $R^1$ and $R^2$ taken together with the nitrogen atom to which they are attached is piperidino, pyrrolidino, or N-(loweralkyl) piperizino; (D) one of the

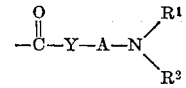

side chains is in the 3-position of the fluoranthene ring and the remaining side chain is in the 8- or 9-position of said fluoranthene ring; or (E) a pharmaceutically acceptable non-toxic acid addition salt thereof.

5. A compound of claim 4 wherein each Y is sulfur, each A is alkylene of 2 to 6 carbon atoms and each $R^1$ and $R^2$ is alkyl of 1 to 5 carbon atoms.

6. A compound of claim 4 wherein each Y is oxygen, each A is alkylene of 2 to 6 carbon atoms and each $R^1$ and $R^2$ is alkyl of 1 to 5 carbon atoms.

7. Bis(N-methyl-4 - piperidyl) fluoranthene-3,9-dicarboxylate or a pharmaceutically acceptable acid addition salt thereof.

8. Bis(2 - diethylaminoethyl) fluoranthene - 3,9-dicarboxylate or a pharmaceutically acceptable acid addition salt thereof.

9. Bis(3 - diethylaminopropyl) fluoranthene-3,9-dicarboxylate or a pharmaceutically acceptable acid addition salt thereof.

10. Bis(3 - diethylaminopropyl) fluoranthene - 3,8-dicarboxylate or a pharmaceutically acceptable acid addition salt thereof.

11. Bis(3 - dibutylaminopropyl) fluoranthene - 3,8-dicarboxylate or a pharmaceutically acceptable acid addition salt thereof.

12. Bis(3 - dipropylaminopropyl) fluoranthene-3,8-dicarboxylate or a pharmaceutically acceptable acid addition salt thereof.

References Cited

UNITED STATES PATENTS 2,652,417    9/1953    Steinberg _____ 260—469

HENRY R. JILES, Primary Examiner

G. THOMAS TODD, Assistant Examiner

U.S. Cl. X.R.

260—268, 293.4, 326.3, 475; 424—250, 267, 274, 309

PO-1050
(5/69)

UNITED STATES PATENT OFFICE
CERTIFICATE OF CORRECTION

Patent No. 3,531,489                    Dated  September 29, 1970

Inventor(s)  William L. Albrecht and Robert W. Fleming

It is certified that error appears in the above-identified patent and that said Letters Patent are hereby corrected as shown below:

Column 1, lines 42 to 45 and column 2, lines 47 to 50, the formula, each occurrence, should appear as follows:

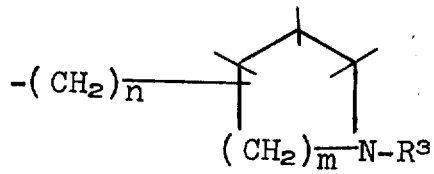

Column 2, line 64 to bottom of column, the left and right hand portions of the formula should appear as follows, respectively;

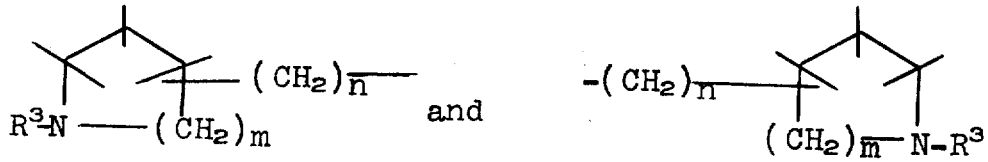

Column 4, lines 21 to 24, the formula should appear as follows:

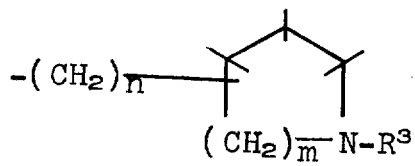

Column 9, line 7, "N aqueous" should read -- N. aqueous --. Column 11, line 11, "M.P. 246-248.5°C.," should read -- M.P. 191.5-194°C., --; column 11, line 36, "10.2 g." should read -- 6.2 g. --. Column 15 and column 16, in Examples No. 39 to 43 in the table opposite Route, in each instance, "Subcutaneous 5 days" should read -- Subcutaneous --. Column 15, line 53, "piperidine, pyrrolidine, or N-(loweralkyl) piperizino;" should read -- piperidino, pyrrolidino, or N-(loweralkyl) piperazino;--

PO-1050
(5/69)

UNITED STATES PATENT OFFICE
CERTIFICATE OF CORRECTION

Patent No. 3,531,489          Dated September 29, 1970

Inventor(s) William L. Albrecht and Robert W. Fleming

It is certified that error appears in the above-identified patent and that said Letters Patent are hereby corrected as shown below:

Column 15, lines 57 to 60, the formula should appear as follows:

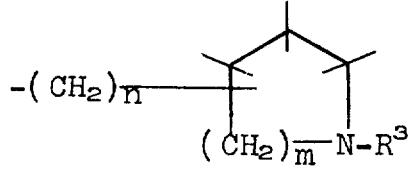

Column 15, line 68 to bottom of column, the left and right hand portions of the formula should read as follows, respectively;

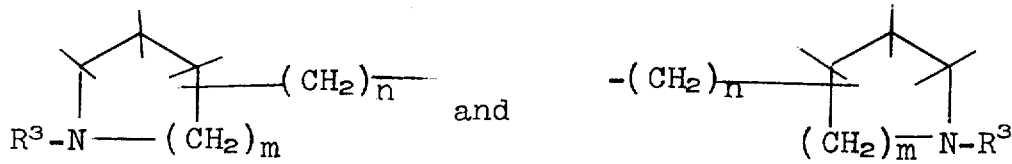

Column 16, line 58, "piperizino" should read -- piperazino --.

SIGNED AND
SEALED
JAN 26 1971

(SEAL)
Attest:

Edward M. Fletcher, Jr.
Attesting Officer

WILLIAM E. SCHUYLER, JR.
Commissioner of Patents